Figure 1:
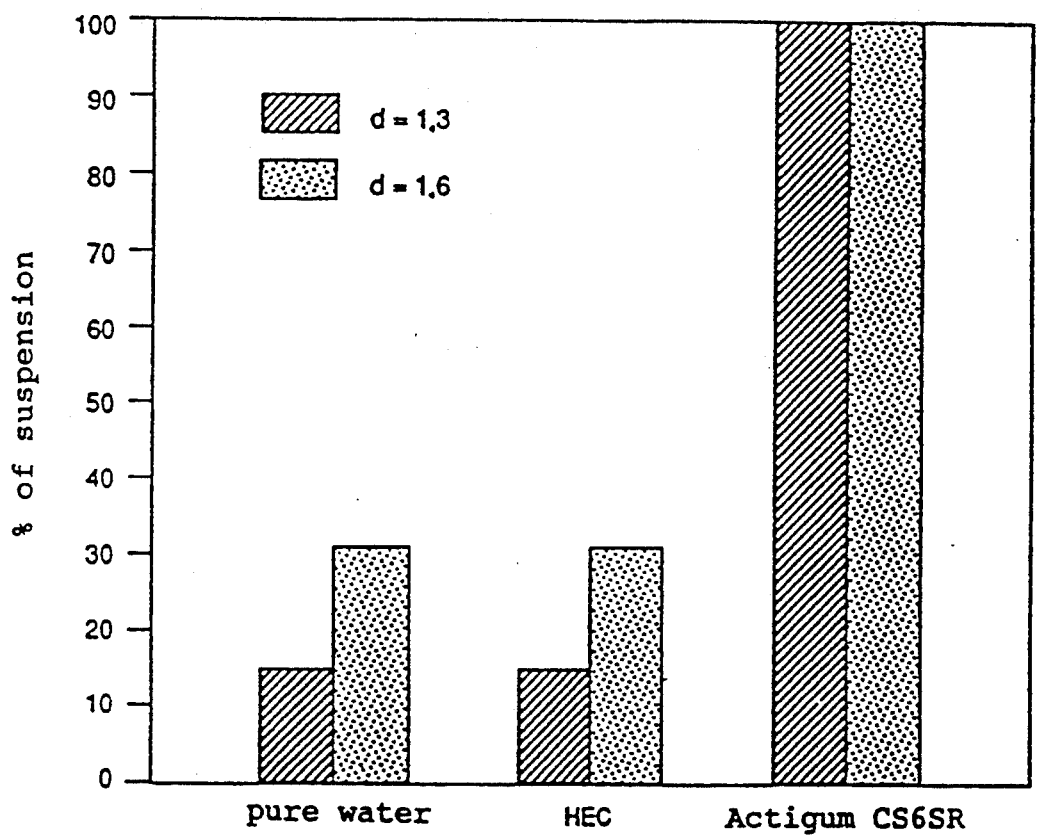

United States Patent [19]
Donche et al.

[11] Patent Number: 5,306,340
[45] Date of Patent: Apr. 26, 1994

[54] SCLEROGLUCAN-BASED COMPOSITIONS AND THEIR USE AS A CEMENTATION SPACER

[75] Inventors: Alain Donche, Jurancon; Patrick Isambourg, Saint Lys, both of France

[73] Assignee: Societe Nationale Elf Aquitaine, Courbevoie, France

[21] Appl. No.: 16,243

[22] Filed: Feb. 11, 1993

[30] Foreign Application Priority Data

Feb. 12, 1992 [FR] France ................ 92 01548

[51] Int. Cl.⁵ .................... C08L 5/00; E21B 33/16
[52] U.S. Cl. .................... 106/208; 252/8.551; 252/315.3; 536/123
[58] Field of Search .......... 106/208; 252/8.551, 252/315.3; 536/123

[56] References Cited

U.S. PATENT DOCUMENTS

| | | | |
|---|---|---|---|
| 4,640,358 | 2/1987 | Sampath | 106/208 |
| 4,647,312 | 3/1987 | Sampath | 106/208 |
| 5,082,577 | 1/1992 | Kohler et al. | 252/8.554 |
| 5,101,902 | 4/1992 | Parcevaux et al. | 252/8.551 |
| 5,143,958 | 9/1992 | Lockhart et al. | 106/194 |
| 5,215,681 | 6/1993 | Truong et al. | 252/315.3 |

OTHER PUBLICATIONS

"Hackh's Chemical Dictionary", 4th Ed., Julius Grant, 1969, p. 78.

*Primary Examiner*—Helene Klemanski
*Attorney, Agent, or Firm*—Birch, Stewart, Kolasch & Birch

[57] ABSTRACT

Use of scleroglucan alone or of mixtures of scleroglucan with a polyalcohol or a dialdehyde as cementation spacers during oil drilling operations.

20 Claims, 2 Drawing Sheets

SCLEROGLUCAN-BASED COMPOSITIONS AND THEIR USE AS A CEMENTATION SPACER

The present invention relates to aqueous scleroglucan-based compositions which can be used as a cementation spacer in the field of the treatment of oil/gas wells.

During the drilling of oil wells, a viscous suspension, called mud, is continuously injected into the formation. The functions of this mud are manyfold. It must cool and lubricate the drilling tool, bring to the surface the debris torn off from the formations and also balance the pressure of the pores of the formations and thus prevent the invasion of the well by drilling fluids. Water-based muds or oil-based muds are used, whose density must be sufficiently high to fill these roles.

When the pipes which must line the well are being put in place, cement must be placed between these pipes and the wall of the well in order to make this annular space leakproof and to anchor the pipes. The pipes are screwed to each other and are lowered into the well. A cement/water mixture, called cement slurry, which has a volume corresponding to all or part of the annular space between the wall and the well, is conveyed into the pipes and driven back using pumps into the annular space where it is left to set.

To ensure that adhesion of the cement is good, the annular space must first of all be freed from debris from the formation suspended in the mud. When using an oil-based mud, it is necessary to remove the thin film of oil deposited on the walls and which would prevent adhesion of the cement.

Moreover, in the majority of cases, the mud and the cement contain incompatible constituents.

In the oil industry, these difficulties are solved by using a fluid, called cementation spacer, placed between the mud and the cement.

This spacer must very obviously be compatible with the mud, on the one hand, and the cement, on the other hand. Its density must be intermediate between that of the mud and that of the cement slurry to prevent the mud and the cement from coming into contact, to ensure good displacement of the mud and to be easily displaceable by the cement slurry. The density must be sufficient to maintain the pressure of the fluids of the formation. The rheology must be suited to the displacement method chosen, namely laminar or turbulent flow.

A cementation spacer usually consists of several additives added to a base fluid which can be water or an oil, namely a viscosifying agent which confers on it its basic rheological characteristics, a weighting agent in order to obtain the required density, a fluid-loss agent in order to prevent invasion of the well by the base fluid of the spacer and a detergent which ensures that the pipes and the walls of the geological formations through which the drilling has passed are cleaned.

The most widely used viscosifying agent is hydroxyethyl cellulose (HEC). European Patent EP-B-0,049,191 describes the preparation of viscous fluids for oil drilling operations from HEC whose dispersion in aqueous medium is facilitated by the addition of a polyfunctional alcohol.

However, hydroxyethyl cellulose displays a serious disadvantage. The viscosity of its solutions falls very suddenly as the temperature increases. Thus, in order to be used during the drilling of deep, hot wells, it is necessary to considerably increase the concentration of hydroxyethyl cellulose in the composition. These very concentrated solutions are difficult to pump at room temperature during their preparation. The use of large quantities of viscosifying agent is also damaging to the economics of the process.

European Patent Application EP-A-207,536 describes the use of biopolymers, such as scleroglucan or xanthan, to viscosify cementation spacers. According to this citation, the cementation spacer is composed of a biopolymer, a weighting agent, a substance for controlling fluid loss and a dispersing agent in aqueous medium.

We have now found that it was possible to prepare cementation spacers consisting essentially of a dispersion of scleroglucan in water. The use of scleroglucan makes it possible to reduce the concentration of the other constituents or even to remove them altogether, especially if the scleroglucan used is unrefined, that is to say that it contains all or part of the mycelium which has produced it. Other advantages of cementation spacers containing scleroglucan, and especially unrefined scleroglucan, will appear during the description.

The subject of the invention is therefore a composition which can be used as a cementation spacer during oil drilling operations, characterised in that it consists essentially of scleroglucan and water.

The scleroglucans which enter into the composition of the cementation spacers according to the invention are nonionic, water-soluble homopolysaccharides with molecular weights greater than 500,000. The molecules consist of a main linear chain formed of D-glucose units connected by 1,3-beta bonds and of which one in three is connected to a side D-glucose unit by a 1,6-beta bond.

These polysaccharides are obtained by fermentation of a sugar-based medium and of inorganic salts under the action of a sclerotium-type microorganism. A more complete description of the scleroglucans and of their preparation can be found in the citation US 3,301,848.

As scleroglucan source for the preparation of the compositions according to the invention, it is possible to use scleroglucan isolated from the fermentation medium which exists in the form of a powder or else of a concentrated solution in an aqueous or water/alcohol solvent.

Preferentially, the scleroglucan entering into the composition is unrefined, that is to say that it contains all or part of the mycelium of the fungus which produced it. Advantageously, the scleroglucan used will contain more than 15 % by weight of the mycelium which has produced it.

The presence of mycelium ensures a much greater viscosity for the same quantity of active material. Moreover, the mycelium contributes greatly to controlling fluid loss. By carpeting the walls of the formation, it prevents invasion of the well by the base fluid of the spacer. The use of an additive as fluid-loss agent is generally superfluous.

The cementation spacer is prepared by mixing scleroglucan and water at room temperature with stirring. The scleroglucan concentration depends on the desired viscosity. The composition generally contains 1 g/l to 20 g/l, and preferably 2 g/l to 6 g/l, of scleroglucan. These figures do not take into account the mycelium which can accompany the active material.

Dispersion of the scleroglucan powder can be facilitated and the formation of lumps avoided by using a scleroglucan modified by a polyalcohol or a dialdehyde.

In the case of modification by a polyalcohol, a mixture of polyalcohol and scleroglucan is prepared, the latter existing in the form of a powder or else of a concentrated aqueous solution in an aqueous or water/alcohol solvent. When the scleroglucan is used in the powder form and the polyalcohol is also solid, such as, for example, in the case of pentaerythritol, it is necessary additionally to use a small quantity of water, so that the mixture obtained exists in the form of a homogeneous paste.

The weight ratio between the alcohol and the scleroglucan must be greater than 1. Good results are generally obtained when this ratio is greater than 3.

The paste is generally composed of 10 to 30% by weight, preferably 10 to 20% by weight, of scleroglucan, of 70 to 90% by weight of polyalcohol and of 0 to 10% of water.

The alcohols used to modify the scleroglucan are:

on the one hand, alcohols whose number of carbon atoms is between 2 and 6, and whose number of hydroxyl groups is also between 2 and 6, among which there may be mentioned ethylene glycol, propylene glycol, glycerol, hexylene glycol, neopentyl glycol, pentaerythritol, sorbitol, diethylene glycol or dipropylene glycol;

on the other hand, alcohols containing a nitrogen atom, whose number of carbon atoms is between 2 and 9, and whose number of hydroxyl groups is between 1 and 3, such as ethanolamines, propanolamines or isopropanolamines.

These alcohols can also be used in the form of one of their monoethers whose carbon number in the alkyl chain of the monoether is between 1 and 4, such as 2-methoxyethanol, 2-ethoxyethanol, 2-propoxyethanol, 2-butoxyethanol, 1-methoxy-2-propanol or 2-methoxy-1-propanol.

In the case of modification of the scleroglucan by a dialdehyde, such as described in French Patent 2,633,940, the scleroglucan, in the form of a powder, solution or suspension, is mixed with 0.5 to 10% by weight of dialdehyde. The scleroglucan used in the powder form stays in this form even after processing, which greatly facilitates its transportation and storage.

Among the dialdehydes, glyoxal is preferably used.

Dispersion of these powders is rapid and without formation of lumps. It takes place whatever the salt content of the water used. With the dispersion material commonly available on drilling sites, the development of viscosity is practically instantaneous in basic fluids. It remains most often less than or equal to 30 minutes in the others.

The water entering into the composition of the cementation spacer can be soft water, seawater or a brine. The brine can contain alkali metal or alkaline-earth metal ions, such as sodium, potassium or calcium. The viscosity of the composition is not affected by these ions, even at a high concentration. Thus, the quality of the water used does not affect the viscosity of the composition. It is also insensitive to the presence of ions in the formation.

It may be necessary to add a weighting agent to the composition, such as barium sulphate. To keep the weighting agent in suspension, it is necessary to viscosify HEC-based cementation spacers with bentonite. Aqueous scleroglucan compositions behave as a threshold fluid. The viscosity of the composition is maintained up to very low shear rates. Thus, barium sulphate remains in suspension in this composition even at rest. It is thus possible to prepare these compositions in advance and to store them until use, without sedimentation.

If the compositions are used during drilling with an oil-based mud, a surface-active agent will be advantageously added to the composition. This surface-active agent stabilises the rheology of the cementation spacer/oil-based mud mixture formed at the interface and especially ensures that the walls of the well are thoroughly cleaned.

Scleroglucan is compatible with the usual surface-active agents. The viscosity of the composition is not affected by the presence of the surface-active agent.

The composition according to the invention has rheological characteristics very well suited to use as a cementation spacer. It combines a very marked pseudoplastic behaviour with a remarkably high yield point. By ensuring a low rheology at high shearings, it facilitates pumping and placing of the fluid in the well. This low rheology does not result in sedimentation of the weighting agent by virtue of the high yield point of the product. The rheological characteristics of the composition also guarantee an excellent displacement of the drilling muds and a perfect isolation of the cement plug.

The viscosity of the compositions according to the invention is very little affected by the temperature; it is practically constant up to 130° C. Thus, the rheological characteristics measured at the surface are representative of those obtained at the bottom of a well. Compared with HEC, whose fall in viscosity at a high temperature must be compensated by a very high viscosity at the surface, the use of the compositions according to the invention reduces head losses for basically the same rheology. It also avoids overconsumption of the viscosifying agent, necessary in the case of HEC in order to compensate for degradation due to the temperature.

The compositions according to the invention are perfectly compatible with the two fluids with which they come in contact during their use, drilling mud and cement slurry. The use of the compositions according to the invention as a cementation spacer makes it possible for the wells to cement thoroughly and for the cement to adhere firmly to the walls.

By virtue of their specific rheological behaviour, their good thermal stability and their compatibility with various contaminants, the compositions according to the invention are also suitable for other types of fluids used during oil drillings, such as test fluids, fracturation fluids, completion fluids or post-cementation fluids.

The invention is illustrated by the following examples given as non-limiting.

The scleroglucan used is manufactured by Sanofi Bio Industries (France) from a Sclerotium rolsfii strain. Two grades of scleroglucan are available: a refined grade containing less than 10% of mycelium, marketed under the name Actigum CSII, and an unrefined grade comprising of the order of 25% of mycelium residues, marketed under the name Actigum CS6. All the tests which follow were carried out with Actigum CS6, either untreated or treated with polyalcohol or treated with glyoxal. Actigum CS6 treated with glyoxal is marketed by Sanofi Bio Industries under the name Actigum CS6SR.

The hydroxyethyl cellulose used is marketed by Hercules, under the name Natrosol 250 HHR-P.

EXAMPLE 1

Dispersion of scleroglucan

The dispersion of Actigum CS6SR and of Actigum CS-S6 have been compared. Actigum CS6SR is added to a soft water, whose pH was brought beforehand to 9.5 by addition of sodium hydroxide solution, at 20° C. with very gentle stirring (IKA DW 20 DZM motor, equipped with a T3/B paddle, operated at 600 rev/min). An immediate dispersion of the powder is observed without any formation of lumps. The complete development of the viscosity of the polymer is rapid. The same operation is reproduced in a water whose pH was not modified. The dispersion of the Actigum CS6SR is also excellent. A slower development of the viscosity is merely observed.

Actigum CS6 is added to a soft water, whose pH was brought beforehand to 9.5 by addition of sodium hydroxide solution, at 20° C. under the same conditions of stirring as above. A copious formation of lumps is observed. The use of a Hamilton Beach mixer is necessary to obtain a perfect dispersion of Actigum CS6.

Table I enables the viscosity developments obtained as a function of time during the three tests above to be compared. The concentration is 5 g/l of scleroglucan. The rheological measurements are carried out using a Brookfield LVT viscometer equipped with a UL adaptor operating at 30 rev/min. It is observed that Actigum CS6SR is well suited to the preparation of cementation spacers which are most often basic.

The dispersion of Actigum CS6 modified with polyalcohol has also been compared with that of Actigum CS6. Actigum CS6 modified with polyalcohol exists in the form of a homogeneous paste. The product used in this example consists of 15% Actigum CS6, 10% water and of 75% propylene glycol.

Actigum CS6 modified with polyalcohol is added to a soft water at 20° C. with stirring (IKA DW 20 DZM motor equipped with a T3/B paddle). The suspension is stirred at a rate of 600 rev/min for 15 min and then at 2,000 rev/min for the following five. The same operation is repeated with Actigum CS6. A copious formation of lumps is observed.

Table II enables the viscosity developments obtained as a function of time during the two tests above to be compared. The concentration is 5 g/l of scleroglucan. The rheological measurements are carried out using a Brookfield LVT viscometer equipped with a UL adaptor operating at 30 rev/min. It is observed that modification of Actigum CS6 with propylene glycol considerably improves the dispersion of the polymer.

TABLE I

| Time (min) | 5 | 10 | 15 | 20 | 30 | 60 |
|---|---|---|---|---|---|---|
| Actigum CS6SR pH = 9.5 | 10 | 120 | 150 | 170 | 185 | 235 |
| Actigum CS6SR pH = 7 | 10 | 45 | 125 | 155 | 180 | 235 |
| Actigum CS6 pH = 9.5 | 15 | 50 | 115 | 150 | 175 | 230 |

Viscosity development (mPa·s) over time of two Actigum CS6SR dispersions and of one Actigum CS6 dispersion (concentration: 5 g/l).

TABLE II

| Time (min) | 1 | 2 | 3 | 5 | 10 | 15 | 20 |
|---|---|---|---|---|---|---|---|
| Modified Actigum CS6 | 100 | 150 | 210 | 290 | 440 | 550 | 1300 |
| Actigum CS6 | 50 | 50 | 50 | 70 | 110 | 150 | 200 |

Viscosity development (mPa·s) over time of a dispersion of Actigum CS6 modified with propylene glycol and of an Actigum CS6 dispersion (concentration: 4 g/l).

EXAMPLE 2

Compatibility of scleroglucan with electrolytes

The viscosities developed by Actigum CS6SR in waters carrying different electrolyte loads have been compared. The suspensions were prepared according to the method described in Example 1 and compared under the same conditions. The rheological measurements are carried out at 20° C. using a FANN 35 rheometer.

Table 3 enables the FANN readings of different suspensions to be compared at the same concentration of viscosifying agent (6 g/l). An excellent rheological behaviour is observed. With respect to soft water, the various electrolytes used are practically without influence on the viscosity developed by scleroglucan.

TABLE 3

| FANN measurements | Soft water | Sea water | NaCl 60 g/l | NaCl 120 g/l | KCl 60 g/l | KCl 120 g/l | CaCl₂ 5 g/l |
|---|---|---|---|---|---|---|---|
| 600 rev/min | 26 | 27 | 28 | 28 | 24 | 24 | 25 |
| 300 rev/min | 20 | 21 | 21 | 21 | 20 | 19 | 19 |
| 200 rev/min | 18 | 19 | 18 | 18 | 17 | 17 | 17 |
| 100 rev/min | 15 | 16 | 15 | 15 | 15 | 14 | 14 |
| 60 rev/min | 14 | 14 | 14 | 14 | 14 | 13 | 13 |
| 30 rev/min | 13 | 13 | 12 | 12 | 12 | 12 | 11 |

Compatibility of Actigum CS6SR with electrolytes (concentration: 6 g/l)

EXAMPLE 3

Suspending power of scleroglucan

Two suspensions of Actigum CS6SR, one at a concentration of 2 g/l and the other of 4 g/l, were prepared according to the method described in Example 1. The two suspensions are prepared in soft water, the pH of which was brought beforehand to 9.5 by addition of sodium hydroxide solution. The densities of these two suspensions are then adjusted to 1.7 by addition of barium sulphate. Table 4 describes the rheological characteristics at 20° C. of the two fluids obtained, measured using a FANN 35 rheometer. After standing for 24 hours in the absence of any stirring, no sedimentation of the barium sulphate is observed. Scleroglucan thus provides the cementation spacers with an excellent suspending power. As the absence of gel was also observed, a prolonged halt in circulation during the cementation will not prevent the spacer from being put back into circulation.

TABLE 4

| FANN measurements | Concentration of scleroglucan | |
|---|---|---|
| | 2 g/l | 4 g/l |
| 600 rev/min | 35 | 50 |
| 300 rev/min | 22 | 33 |
| 200 rev/min | 16 | 27 |
| 100 rev/min | 10 | 20 |
| 60 rev/min | 8 | 18 |
| 30 rev/min | 6 | 15 |
| 6 rev/min | 4 | 11 |
| 3 rev/min | 3 | 10 |

Rheological characteristics at 20° C. of two suspensions of Actigum CS6SR and of barium sulphate at a density of 1.7.

The suspending powers of Actigum CS6SR and hydroxyethyl cellulose have also been compared. Hydroxyethyl cellulose is commonly used for the rheological control of cementation spacers. A suspension of Actigum CS6SR, at a concentration of 5 g/l in a water whose pH was brought beforehand to 9.5, was prepared according to the method described in Example 1. A suspension of hydroxyethyl cellulose at a concentration of 5 g/l was prepared in the same water by using the method described in Example 1 for the suspending of Actigum CS6 (Hamilton Beach mixer). A fluid with a density of 1.3 and another with a density of 1.6 were prepared from each suspension by addition of barium sulphate. The different fluids are then maintained at 90° C. for 16 hours in the absence of any stirring.

FIG. 1 enables the degree of suspension recorded in the four fluids to be compared. It appears that the barium sulphate has completely settled out in the two hydroxyethyl cellulose suspensions. On the other hand, scleroglucan suspensions have not settled out. It is thus shown that scleroglucan retains its suspending power with temperature.

EXAMPLE 4

Compatibility of scleroglucan and surface-active agents

A suspension of Actigum CS6SR, at a concentration of 3 g/l in a soft water whose pH was brought beforehand to 9.5 by addition of sodium hydroxide solution, was prepared according to the method described in Example 1. The density of this suspension is adjusted to 1.70 by addition of barium sulphate. 3% by volume of the detergent D 607 of the company Dowell-Schlumberger is then incorporated in this fluid. The detergent D 607 is commonly used in cementation spacers. It ensures that the space to be cemented is cleaned, especially during drillings carried out with oil-based muds. After storing for two hours in the absence of any stirring, no sedimentation of the barium sulphate is observed. This result shows the good compatibility of scleroglucan and the detergent D 607 which can be incorporated without risk in a spacer containing scleroglucan.

EXAMPLE 5

Rheological behaviour of scleroglucan

The rheological behaviour of two suspensions of Actigum CS6SR and one suspension of hydroxyethyl cellulose are compared. The two scleroglucan suspensions are prepared according to the method described in Example 1, one at a concentration of 4 g/l and the other at a concentration of 6 g/l, and in a soft water whose pH was brought beforehand to 9.5 A suspension of hydroxyethyl cellulose was prepared in the same water at a concentration of 5 g/l by using the method described in Example 1 for the suspending of Actigum CS6 (Hamilton Beach mixer).

The rheological measurements are carried out at 20° C. using a Carri-Med rheometer (applied stress viscometer).

Figure 2:
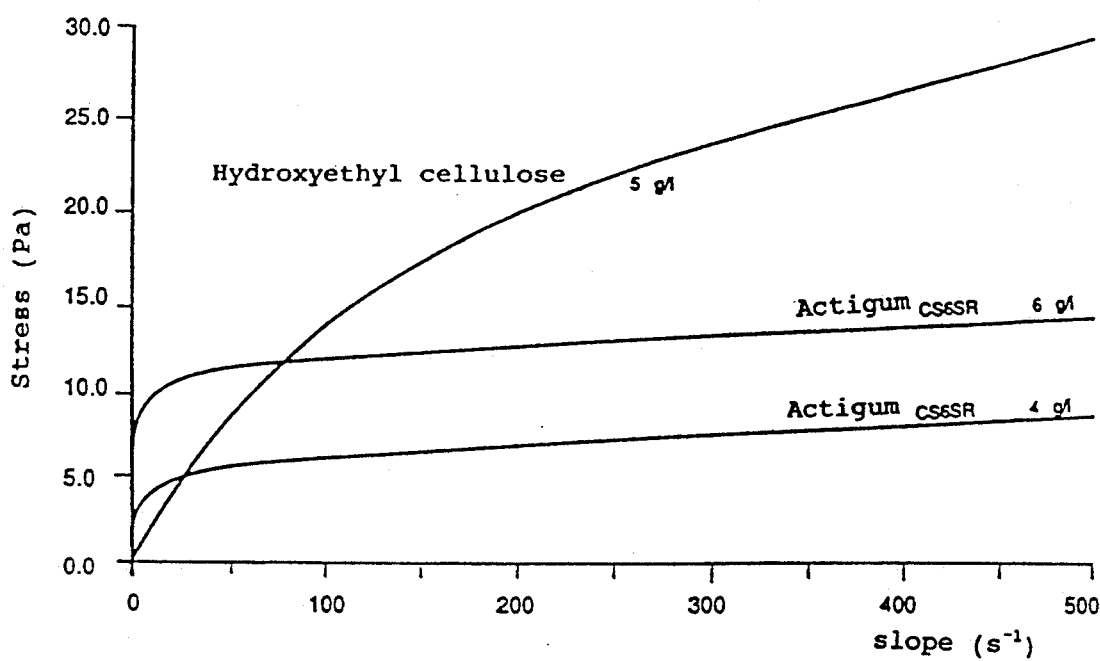

FIG. 2 enables the rheological behaviours of the three suspensions to be compared. It is observed that the scleroglucan suspensions have, in contrast to hydroxyethyl cellulose, a very marked pseudoplastic behaviour, characterised by a reduced stress at high shear rates. They also have a remarkably high yield point which is totally absent in the case of hydroxyethyl cellulose. These two properties are particularly desired in drilling/completion.

EXAMPLE 6

Behaviour of scleroglucan with temperature

The viscosities developed by Actigum CS6SR between 25° and 140° C. were compared with those developed by hydroxyethyl cellulose under the same conditions. The suspension of Actigum CS6SR is prepared according to the method described in Example 1 with a soft water whose pH is adjusted to 9.5 by addition of sodium hydroxide solution. The suspension of hydroxyethyl cellulose was prepared in the same water according to the method described in Example 1 for the suspending of Actigum CS6 (Hamilton Beach mixer). The respective characteristics of Actigum CS6SR and hydroxyethyl cellulose are adjusted such that the viscosities of the two suspensions are identical at 25° C. and of the order of those applied in cementation spacers (8 g/l for the suspension of Actigum CS6SR and 4 g/l for the suspension of hydroxyethyl cellulose). The two suspensions are compared under the same conditions. The rheological measurements are carried out using a FANN 70 rheometer at a shear rate of 340 s$^{-1}$.

Table 5 enables the FANN readings of the two suspensions between 25° and 140° C. to be compared. A very strong fall in rheology with temperature is observed for the suspension of hydroxyethyl cellulose whereas the scleroglucan suspension shows an excellent stability in it rheology up to 130° C.

This property is particularly desired in drilling/completion because it ensures that the rheology of the cementation spacer is controlled during circulation and at the bottom of the well.

TABLE 5

| Suspension Temperature (°C.) | Actigum CS6SR | Hydroxyethyl cellulose |
|---|---|---|
| | Viscosity (mPa · s) | |
| 25 | 50 | 50 |
| 30 | 50 | 45 |
| 40 | 49 | 30 |
| 50 | 48 | 24 |
| 60 | 47 | 12 |
| 70 | 46.5 | 6 |
| 80 | 45 | 3 |
| 90 | 45 | 3 |
| 100 | 45 | 3 |
| 110 | 45 | 3 |
| 120 | 46.5 | 3 |
| 130 | 43.5 | 3 |
| 140 | 4.5 | 3 |

Behaviour with temperature of a suspension of Actigum CS6SR (8 g/l) and a suspension of hydroxyethyl cellulose (4 g/l).

EXAMPLE 7

Compatibility of scleroglucan with cement slurries

The viscosities developed by different mixtures of a suspension of Actigum CS6SR and a cement slurry were compared. The suspension of Actigum CS6SR is prepared, in a soft water whose pH was adjusted to 9.5 by addition of sodium hydroxide solution, according to the method described in Example 1, with a concentration of 3 g/l. The suspension of Actigum CS6SR is mixed in variable proportions with a cement slurry with a density d=1.9.

The different fluids are compared under the same conditions. The rheological measurements are carried out at 20° C. using a FANN 35 rheometer.

Table 6 enables the FANN readings of various cement slurry/scleroglucan suspension mixtures to be compared. An excellent compatibility of the components of the two suspensions is observed. All the rheologies of the mixtures are intermediate between that of the suspension of Actigum CS6SR and that of the cement slurry.

TABLE 6

| FANN measurements | A | A/B (75/25) | A/B (50/50) | A/B (25/75) | B |
|---|---|---|---|---|---|
| 600 rev/min | 14 | 24 | 21 | 41 | 183 |
| 300 rev/min | 9 | 12 | 11 | 23 | 103 |
| 200 rev/min | 7 | 9 | 8 | 15 | 80 |
| 100 rev/min | 5 | 6 | 6 | 13 | 55 |
| 60 rev/min | 4 | 4 | 6 | 10 | 44 |
| 30 rev/min | 4 | 3 | 5 | 9 | 39 |
| 6 rev/min | 3 | 3 | 4 | 6 | 19 |
| 3 rev/min | 3 | 3 | 4 | 6 | 13 |

Compatibility of a suspension of Actigum CS6SR at a concentration of 3 g/l (A) and a cement slurry with a density d=1.9 (B).

We claim:

1. A spacer composition, comprising (1) water, (2) unrefined scleroglucan which contains at least 15%, by weight, of the mycelium which produced said scleroglucan based on the total amount of mycelium in the producing fungus, and (3) at least one compound selected from the group consisting of polyalcohols, monoethers of polyalcohols, alkanolamines, and dialdehydes.

2. The spacer composition according to claim 1, wherein said unrefined scleroglucan is contained in an amount of 1 g/l to 20 g/l.

3. The spacer composition according to claim 1, wherein said spacer composition contains a polyalcohol in a weight ratio to scleroglucan of greater than 3.

4. The spacer composition according to claim 3 wherein said polyalcohol is selected from the group consisting of ethylene glycol, propylene glycol, glycerol, hexylene glycol, neopentyl glycol, pentaerythritol, sorbitol, diethylene glycol and dipropylene glycol.

5. The spacer composition according to claim 1, wherein said spacer composition contains a monoether of polyalcohol in a weight ratio of scleroglucan of greater than 3.

6. The spacer composition according to claim 5, wherein said monoether is selected from the group consisting of 2-methoxyethanol, 2-ethoxyethanol, 2-propoxyethanol, 2-butoxyethanol, 1-methoxy-2-propanol and 2-methoxy-1-propanol.

7. The spacer composition according to claim 1, wherein said spacer composition contains an alkanolamine in a weight ratio to scleroglucan of greater than 3.

8. The spacer composition according to claim 7, wherein said alkanolamine is selected from the group consisting of ethanolamine, propanolamine, and isopropanolamine.

9. The spacer composition according to claim 1, wherein said spacer composition contains a dialdehyde in a weight ratio to acleroglucan of 0.005 to 0.1.

10. The spacer composition according to claim 1, further comprising a weighting agent.

11. The spacer composition according to claim 1, further comprising a surface-active agent.

12. The spacer composition according to claim 2, wherein the scleroglucan is contained in an amount of 2 g/l to 6 g/l.

13. The spacer composition according to claim 7, wherein the dialdehyde is glyoxal.

14. The spacer composition according to claim 10, wherein the weighting agent is barium sulphate.

15. A spacer composition consisting essentially of water, 2-6 g/l of unrefined scleroglucan which contains at least 15% by weight of the mycelium which produced said scleroglucan based on the total amount of mycelium in the producing fungus, and optionally a surface-active agent.

16. A composition comprising 10 to 30% by weight of unrefined scleroglucan which contains at least 15% by weight of the mycelium which produced said scleroglucan based on the total amount of producing fungus, 70 to 90% by weight of polyalcohol, and 0 to 10% by weight of water.

17. The composition according to claim 16, wherein said unrefined scleroglucan is contained in an amount of from 10 to 20% by weight.

18. A method for producing a spacer composition which comprises diluting a scleroglucan composition with water; said scleroglucan composition comprising unrefined scleroglucan which contains at least 15% by weight of the mycelium which produced said scleroglucan based on the total amount of mycelium in the producing fungus.

19. The method according to claim 16, wherein said scleroglucan composition comprises 10 to 30% by weight of said unrefined scleroglucan, 70 to 90% by weight of polyalcohol and 0 to 10% by weight of water.

20. The method according to claim 16, wherein said scleroglucan composition comprises said unrefined scleroglucan and a dialdehyde in a weight ratio of 90:10 to 99.5:0.5.

* * * * *